United States Patent
Usui

(10) Patent No.: US 6,854,572 B2
(45) Date of Patent: Feb. 15, 2005

(54) ELECTRICALLY OPERATED DISC BRAKE

(75) Inventor: Takuya Usui, Kanagawa (JP)

(73) Assignee: Tokico Ltd., Kanagawa-ken (JP)

( * ) Notice: Subject to any disclaimer, the term of this patent is extended or adjusted under 35 U.S.C. 154(b) by 167 days.

(21) Appl. No.: 10/372,974

(22) Filed: Feb. 26, 2003

(65) Prior Publication Data

US 2004/0035655 A1 Feb. 26, 2004

(30) Foreign Application Priority Data

Feb. 28, 2002 (JP) .......................... 2002/054584

(51) Int. Cl.$^7$ .......................... F16D 55/08; F16D 55/16
(52) U.S. Cl. ...................... 188/72.8; 188/71.7; 188/156; 188/162
(58) Field of Search ............................ 188/71.4, 71.7, 188/71.9, 72.7, 72.8, 155, 156, 157, 158, 159, 160, 161, 162; 277/437, 438, 410

(56) References Cited

U.S. PATENT DOCUMENTS

| | | | | |
|---|---|---|---|---|
| 6,279,691 B1 | * | 8/2001 | Takahashi et al. | 188/72.8 |
| 6,325,182 B1 | * | 12/2001 | Yamaguchi et al. | 188/72.8 |
| 6,491,140 B2 | * | 12/2002 | Usui et al. | 188/72.1 |
| 6,571,921 B2 | * | 6/2003 | Ohtani et al. | 188/72.1 |
| 6,607,059 B1 | * | 8/2003 | Kapaan et al. | 188/72.8 |
| 2003/0042084 A1 | * | 3/2003 | Kawase et al. | 188/72.1 |

FOREIGN PATENT DOCUMENTS

| | | | |
|---|---|---|---|
| JP | 11280800 | * | 10/1999 |
| JP | 2000346109 | * | 12/2000 |
| JP | 2001343038 | * | 12/2001 |
| JP | 200213562 | * | 1/2002 |
| JP | 200213568 | * | 1/2002 |
| JP | 2003113877 | * | 4/2003 |
| WO | 00/60255 | | 10/2000 |

* cited by examiner

*Primary Examiner*—Jack Lavinder
*Assistant Examiner*—Devon Kramer
(74) *Attorney, Agent, or Firm*—Wenderoth, Lind & Ponack L.L.P.

(57) ABSTRACT

An electrically operated disc brake includes a ball/ramp mechanism operable to convert rotary motion of an electric motor to linear motion and transmit the linear motion to a piston so that the piston is advanced to urge a pair of friction pads against opposite sides of a disc rotor to produce a barking force. The disc brake also includes a pad wear adjusting mechanism operable to threadably move the piston relative to an axially movable member of the ball/ramp mechanism in response to the amount of pad wear. The axially movable member has a female thread along its full length. The piston includes a piston head and a piston rod joined to the piston head. The piston rod has a male thread or threaded section. The threaded section has a length such that the piston can safely be moved together and relative to the axially movable member. The piston also has a smooth section extending from the threaded section toward the disc rotor. A holder is secured to the caliper body and carries a seal in which the smooth section of the piston rod is slidably received. A dust boot is connected between the piston head and the caliper body. A combination of the dust boot and the seal or dual seal arrangement reliably seals the interior of the caliper body.

4 Claims, 11 Drawing Sheets

ELECTRICALLY OPERATED DISC BRAKE

BACKGROUND OF THE INVENTION

The present invention relates generally to disc brakes for vehicles and more particularly, to an electrically operated disc brake wherein a motor torque is used to produce a braking force.

A known electrically operated disc brake includes a caliper body within which a ball/ramp mechanism is arranged to convert rotary motion of an electric motor to linear motion and transmit the linear motion to a piston. The piston is advanced in response to operation of the electric motor so as to urge a pair of friction pads against opposite sides of a disc rotor to brake the rotor.

In such an electrically operated disc brake, the ball/ramp mechanism as well as the electric motor is subject to malfunction in the even that water and dust accidentally enters within the caliper body. To this end, attempts have been made to provide a dust boot between the caliper body and one end of the piston located adjacent to the disc rotor.

The dust boot is, however, exposed to severe environment during operation of the vehicle and is susceptible to damage due to contact with stones and various other obstacles.

A seal may be disposed between the cylindrical wall of the piston and the caliper body. The seal and the duct boot may cooperate together to effectively protect the ball/ramp mechanism from damage. However, such a seal can not be used with a pad wear adjusting mechanism generally used in the electrically operated disc brake. The pad wear adjusting mechanism is operable to threadably move the piston relative to an axially movable member of the ball/ram mechanism in response to the amount of pad wear (see, for example, Japanese laid-open patent publication No. 2000-145843). The piston has a threaded section along its full length. This arrangement inhibits the use of the seal between the piston and the caliper body.

Accordingly, it is an object of the present invention to provide an electrically operated disc brake which ensures safe operation of a ball/ramp mechanism and which permits the use of a dual seal arrangement to significantly increase the useful life of the electrically operated disc brake.

SUMMARY OF THE INVENTION

To achieve the foregoing object, the present invention provides an electrically operated disc brake which comprises a caliper having a caliper body, an electric motor mounted within the caliper body, a piston supported by the caliper body and operatively connected to the electric motor, a ball/ramp mechanism disposed within the caliper body and including an axially movable member with a threaded section threadably engaged with a threaded section of the piston, the ball/ramp mechanism being operable to convert rotary motion of the electric motor to linear motion and transmit the linear motion to the piston so that the piston is advanced in response to operation of the electric motor to urge a pair of friction pads against opposite sides of a disc rotor to thereby produce a braking force, a pad wear adjusting mechanism disposed within the caliper body and operable to threadably move the threaded section of the piston relative to the threaded section of the axially movable member in response to the amount of pad wear, a dust boot connected between the piston and the caliper body, a holder associated with the caliper body to collectively define a caliper housing within which the electric motor, the ball/ramp mechanism and the pad wear, adjusting mechanism are contained, the holder having an opening through which the piston extends, and a seal disposed in the opening of the holder, wherein the piston has a smooth section extending from the threaded section toward the disc rotor and slidably received in the seal. The smooth cylindrical surface of the piston rod acts as a sliding surface. This arrangement permits the use of a dual seal arrangement, that is, a combination of the seal and the dust boot.

The holder may be in the form of a cup and may have a cylindrical wall positioned to firmly press one end of the dust boot against the caliper body. In such a case, the holder is used to hold both the seal and the dust boot in position. This arrangement results in a reduction in the fabrication cost of the electrically operated disc brake.

The piston may include a relatively large diameter circular disc or piston head located adjacent to the disc rotor and connected to the dust boot, and a relatively small diameter piston rod on which the smooth cylindrical surface is present. The piston rod may be joined to the piston head. The large diameter piston head enables the dust boot to be mounted in a compact fashion.

DETAILED DESCRIPTION OF THE INVENTION

Figure 1:
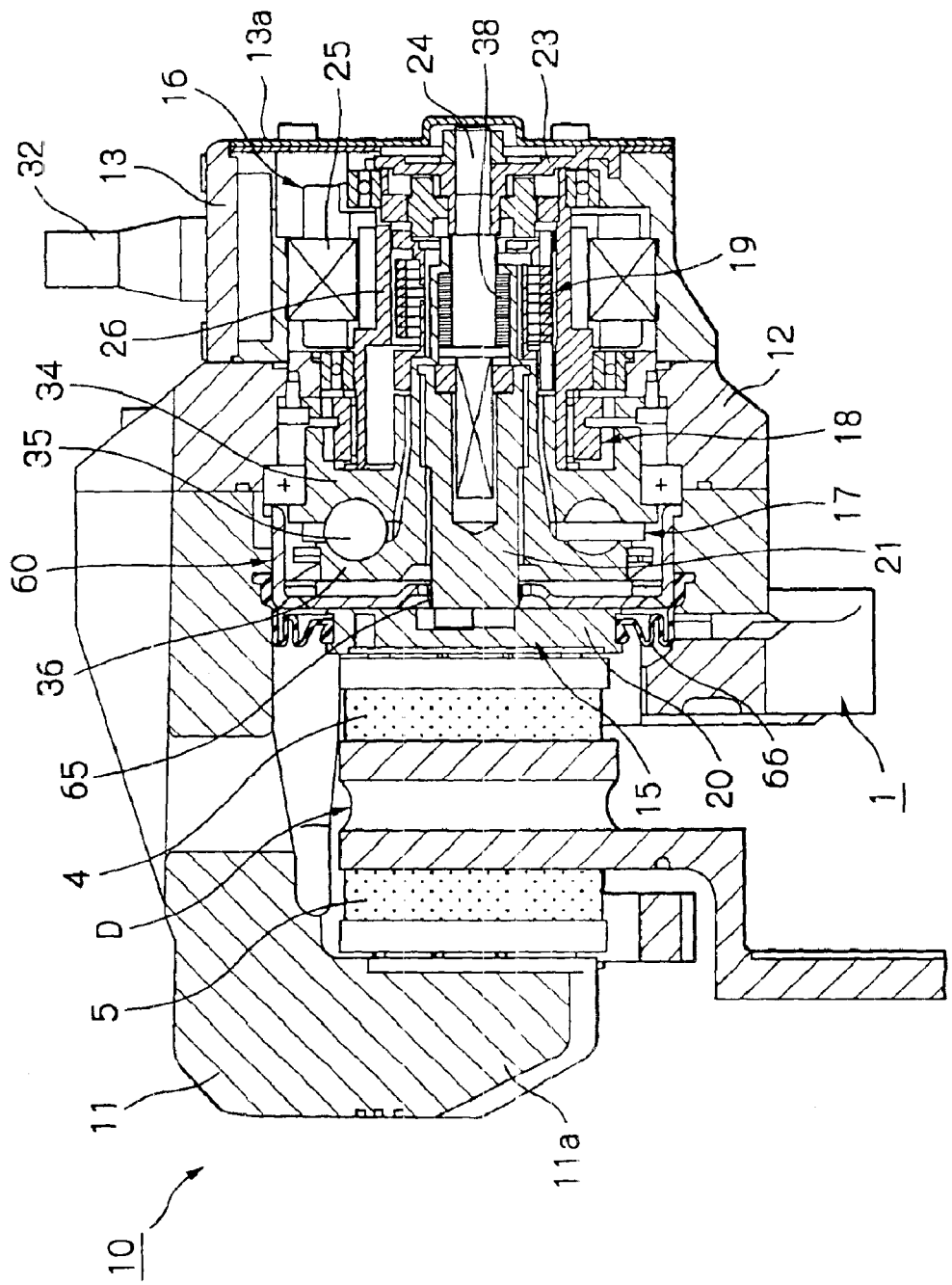
FIG. 1 is a longitudinal sectional view of an electrically operated disc brake according to one embodiment of the present invention.

The present invention will now be described by way of example, with reference to the accompanying drawings.

FIGS. 1 to 9 illustrate an electrically operated disc brake according to one embodiment of the present invention. Referring specifically to FIG. 1 and FIGS. 6 to 9, the electrically operated disc brake includes, among others, a carrier 1 fixed to a stationary part of the vehicle, such as a knuckle, located inboardly of a disc rotor D and having a pair of right and left support members 2, 2, a caliper 10 slidably supported on a pair of axial pins 3, 3 carried by the support members 2, 2, and a pair of inboard and outboard friction pads 4, 5 disposed at opposite sides of the rotor D and supported for axial movement.

The caliper 10 includes a caliper assembly or body 14 formed by a pawl 11, an annular base body 12 secured to the inboard side of the pawl 11 by bolts, not shown, and a motor casing 13 joined to the base body 12. The pawl 11 is provided at its outboard end with a leg 11a. The leg 11a is located adjacent to the outboard side of the outboard friction pad 5. The motor casing 13 has an open rear end closed by a cover plate 13a.

Figure 2:
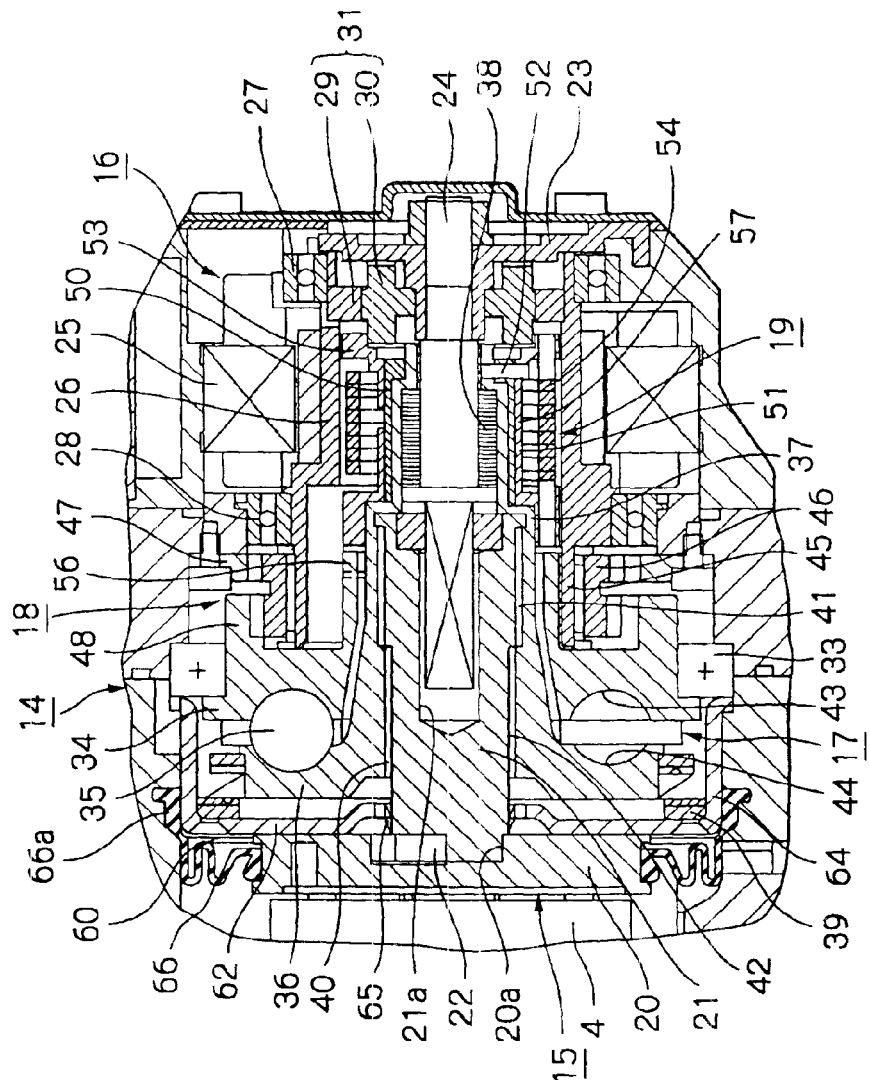
FIG. 2 is a partial sectional view showing the principal part of the electrically operated disc brake shown in FIG. 1.

As shown in FIGS. 1 and 2, disposed within the caliper body 14 are a piston 15, an electric motor 16, a ball/ramp mechanism 17, a reduction mechanism 18 and a pad wear adjusting mechanism 19. The piston 15 can be held in contact with the inboard side of the inboard friction pad 4. The ball/ramp mechanism 17 is adapted to convert rotary motion of the electric motor 16 into linear motion and transmit the linear motion to the piston 15. The reduction mechanism 18 serves to reduce the speed of rotary power transmission from the electric motor 16 to the ball/ramp mechanism 17. The pad wear adjusting mechanism 19 is used to adjust the position of the piston 15 to compensate for pad wear.

The piston 15 includes a relatively large diameter piston head 20 disposed adjacent to the inboard friction pad 4, and a relatively small diameter piston rod 21 extending from the piston head 20 toward the motor 16. The piston head 20 is in the form of a circular disc. A recess 20a is defined in the inboard side of the piston head 20. The outboard end of the piston rod 21 is press fit into the recess 20a to join the piston head 20 and the piston rod 21 together. A key 22 radially extends between the piston head 20 and the piston rod 21 so that they are coupled nonrotatably together. The piston rod 21 has an axial bore 21a of a hexagonal or any other noncircular section. A support rod 24 extends from an end plate 23 which is, in turn, connected to the rear end of the motor casing 13. The front end of the support rod 24 has a hexagonal or; any other noncircular section and is fit into the bore 21a of the piston rod 21. Thus, the piston 15 is free to slide on the support rod 24, but is held against rotation with respect to the support rod 24.

The electric motor 16 includes a stator 25 tightly fit within the motor casing 13, and a hollow rotor 26 disposed within the stator 25. The rotor 26 is rotatably supported within the motor casing 13 through bearings 27, 28. Although not shown in the drawings, a controller instructs the motor to exert the desired torque to the rotor 26. Angular position of the rotor 26 is detected by an angular position sensor 31. The angular position sensor 31 is composed of a resolver rotor 29 secured to the rotor 26 and a resolver stator 30 secured to the end plate 23 of the motor casing 13. The motor casing 13 is provided with a connector 32 for receiving a cable (power and signal lines). The cable provides an electrical connection between the stator 25 and the angular position sensor 31 and the controller.

The ball/ramp mechanism 17 includes an annular first disc member 34 rotatably supported in the annular base body 12 of the caliper body 10 through a bearing 33, and an annular second disc member or axially movable member 36 operatively associated with the first disc member 34 through balls 35. The second disc member 36 has a stepped cylindrical portion 37 which extends between the piston rod 21 and the first disc member 34 and terminates within the motor casing 13. Disposed between one end of the cylindrical portion 37 remote from the second disc member 36 and the support rod 24 are a plurality of disc springs 38 adapted to normally urge the second disc member 36 toward the first disc member 34. A cup-shaped holder 60 is disposed behind the piston head 20 as will later be described in more detail. A wave washer 39 is arranged within the holder 60 to limit rotation of the second disc member 36.

The cylindrical portion 37 of the second disc member 36 is formed on its inner periphery with a female thread 40. The piston rod 21 is also formed on its outer periphery with a male thread 41. The female thread 40 of the cylindrical portion 37 is threadably engaged with the male thread of the piston rod 21 so that the second disc member 36 is operatively connected to the piston 15. The female thread 40 of the cylindrical portion 37 extends along substantially the full length of the piston rod 21. On the other hand, the male thread 41 is present only in the inboard end portion of the piston rod 21. The male thread 41 has a length such that the piston 15 can safely be moved by the second disc member 36 in term of the strength regarding thread mating. Illustratively, the male thread 41 extends approximately half of the full length of the piston rod 21. The outboard end of the piston rod 21 has no thread and provides a smooth cylindrical surface 42. The female thread 40 of the cylindrical portion 37 has a sufficient length to ensure afore-said strength of engagement between threads for movement of the piston 15 for normal braking and to provide brake pad wear adjustment.

Three arcuate ball grooves 43 are defined in the outboard side of the first disc member 34 and extend in the direction of circumference of the second disc member 34. Three corresponding arcuate ball grooves 44 are defined in the inboard side of the second disc member 36 and extend in the direction of circumference of the second disc member 36. The balls 35 are received in the respective pairs of ball grooves 43. 44. The ball grooves 43, 44 are inclined in the same direction. The ball grooves 43, 44 extend along approximately one fourth of the entire circumference of the disc members 34, 36 and are arranged at equal intervals. When the first disc member 34 is rotated in a clockwise direction as seen from the right side of FIGS. 1 and 2, the second disc member 36 is linearly moved to the left in FIGS. 1 and 2. At this time, the second disc member 36 is held against rotation by means of the wave washer 39. During the linear movement of the second disc member 36, the piston 15 is advanced to thereby urge the inboard friction pad 4 against the disc rotor D. When the first disc member 34 is rotated in a counterclockwise direction as seen from the right side of FIGS. 1 and 2, the second disc member 36 is retreated or moved to the right in FIGS. 1 and 2 as the balls 35 are clamped between the first disc member 34 and the second disc member 36 under the influence of the disc springs 38. Retreat of the second disc member 36 causes separation of the piston 15 from the inboard friction pad 4.

The reduction mechanism 18 includes an eccentric shaft or sleeve 45 extending from the rotor 26 toward the disc rotor D, an eccentric gear 46 rotatably fit around the eccentric sleeve 45 and having a pair of externally toothed gears, a first internally toothed gear 47 secured to the caliper body 14 and engaged with one of the externally toothed gears of the eccentric gear 46, and a second internally toothed gear 48 integrally formed in the rear end of the first disc member 34 and engaged with the other externally toothed gear of the eccentric gear 46. With mating engagement of the first and second internally toothed gears 47, 48, the eccentric gear 46 is moved in an orbital manner during rotation of the eccentric sleeve 45. The first disc member 34 is then rotated in a direction opposite the direction of rotation of the rotor 26 with a fixed reduction ratio.

The pad wear adjusting mechanism 19 includes, among others, a limiter 51 disposed around the cylindrical portion 37 of the second disc member 36 via a spacer 50 and operatively connected to the first disc member 34, a spring holder 53 fit around the cylindrical portion 37 of the second disc member 36, and a coil spring 54 disposed around the spring holder 53. The spring holder 53 is pinned as at 52 to the second disc member 36 so that the spring holder 53 is held against rotation with respect to the second disc member 36. The spring holder 53 has a flange. The coil spring 54, has one end connected to the limiter 51 and the other end connected to the flange of the spring holder 53.

Figure 3:
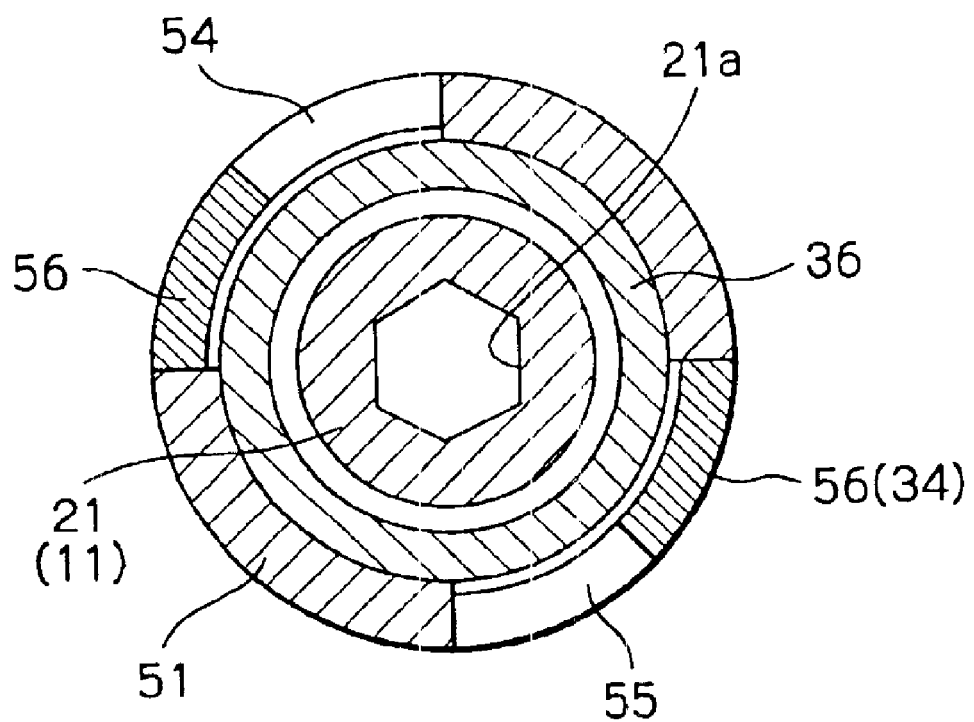
FIG. 3 is a cross sectional view of a pad wear adjusting mechanism as a principal part of the electrically operated disc brake.

As shown better in FIG. 3, the limiter 51 is formed on its one end with two arcuate grooves 55 circumferentially spaced from one another by 180 degrees. It is to be understood that three or more equally spaced arcuate grooves may alternatively be formed in the limiter 51. Two arcuate projections 56 extend from the inboard end of the first disc member 34 and are received within the respective grooves 55. The circumferential length of the arcuate grooves 55 is sufficiently greater than the width of the arcuate projections 56. Thus, the limiter 51 and the first disc member 34 are rotated relative to one another to the extent that the arcuate projections 56 can be moved within the arcuate grooves 55. As shown in FIG. 2, the limiter 51 and the spring holder 53 are provided with detents 57 engageable to limit relative rotation of the limiter 51 and the spring holder 53 in one direction. To allow the detents to engage together, the coil spring 54 is disposed between the limiter 51 and the spring holder 53 with a predetermined amount of offset or preload. The amount of preload is greater than the amount of resistance to rotation of the second disc member 36 provided by the wave washer 39 and other elements.

Figure 4:
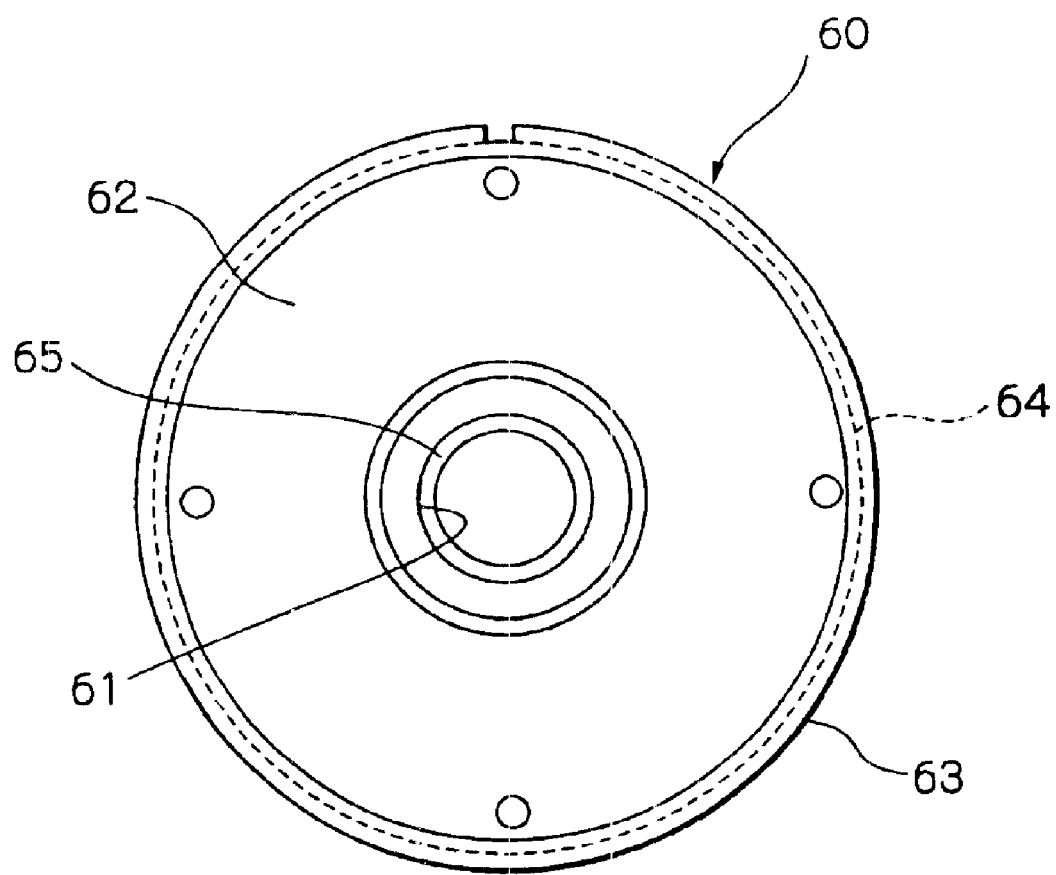
FIG. 4 is a front view, on an enlarged scale, of a seal and a holder used in the electrically operated disc brake.
Figure 5:
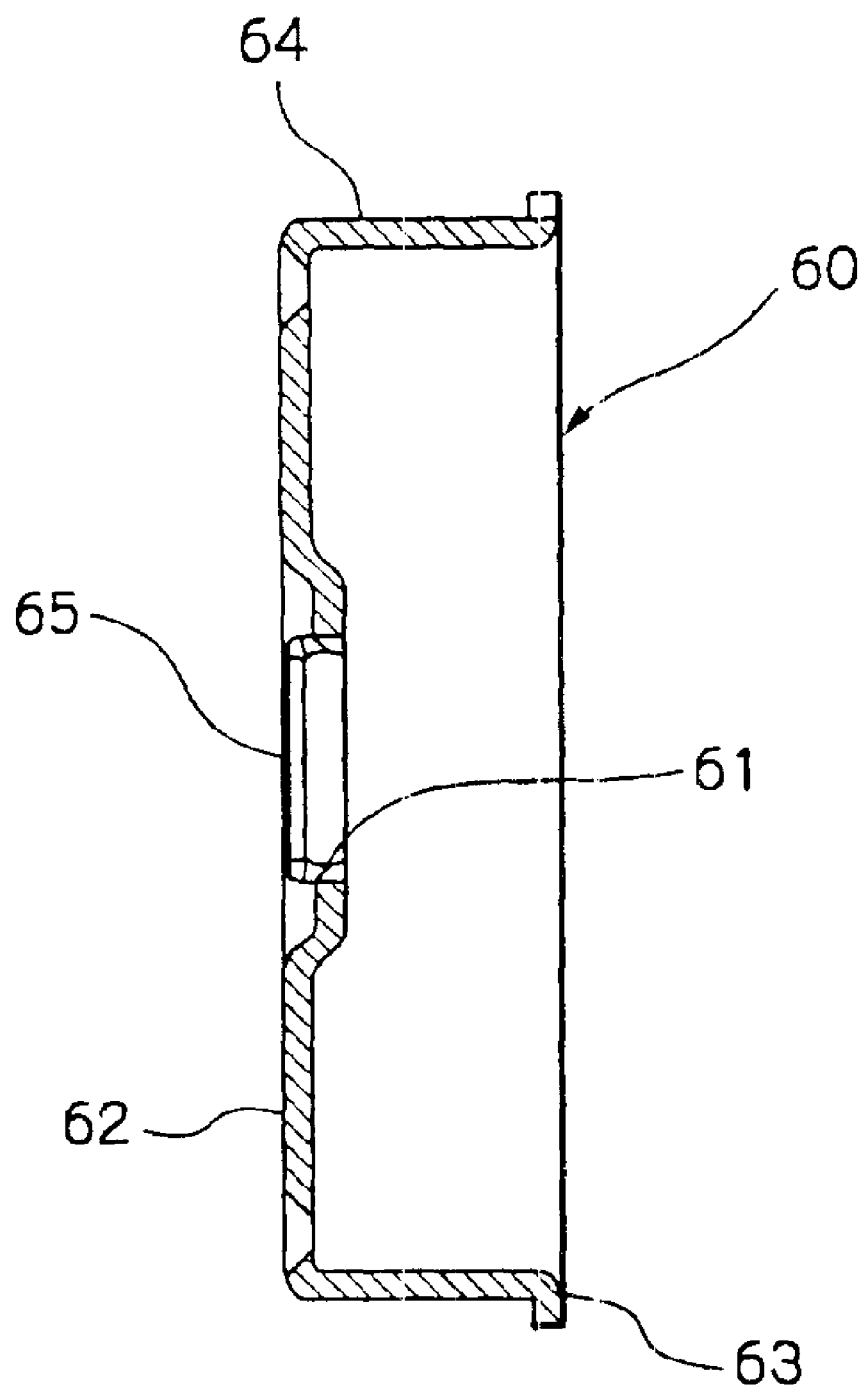
FIG. 5 is a longitudinal sectional view of the seal and the holder shown in FIG. 4.
Figure 6:
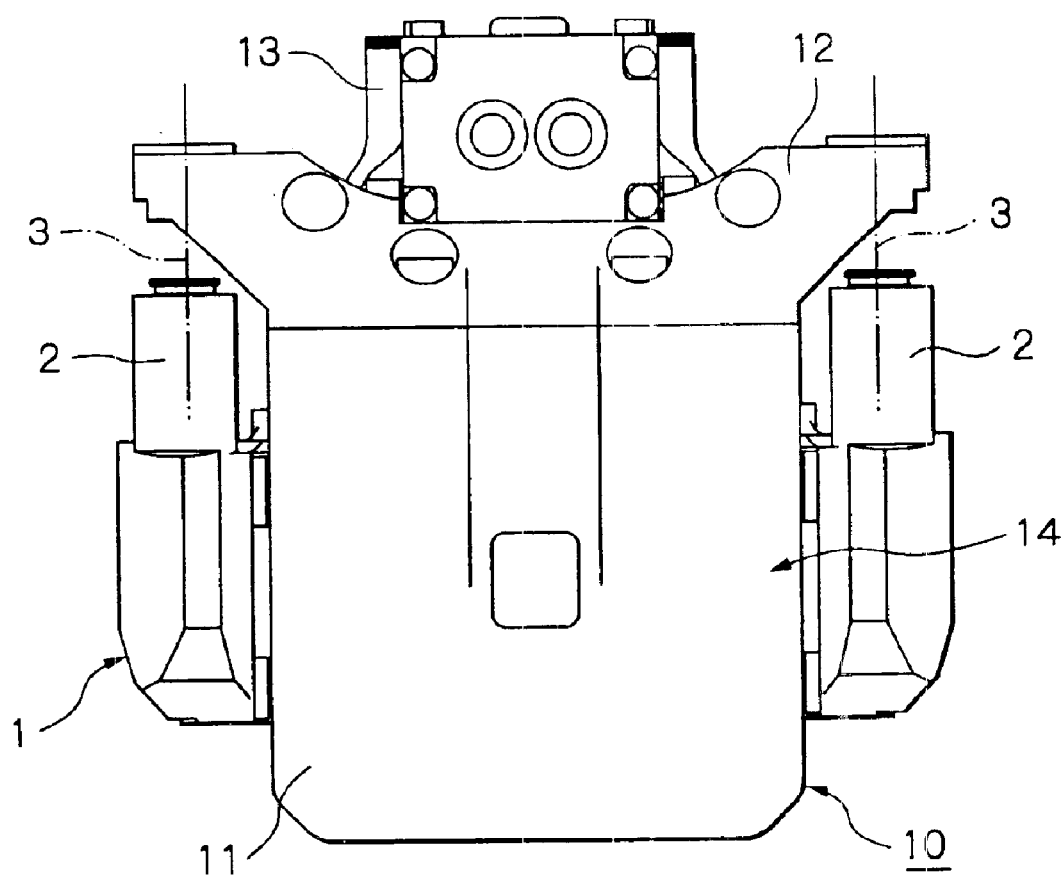
FIG. 6 is a top plan view of the electrically operated disc brake in its entirety.
Figure 7:
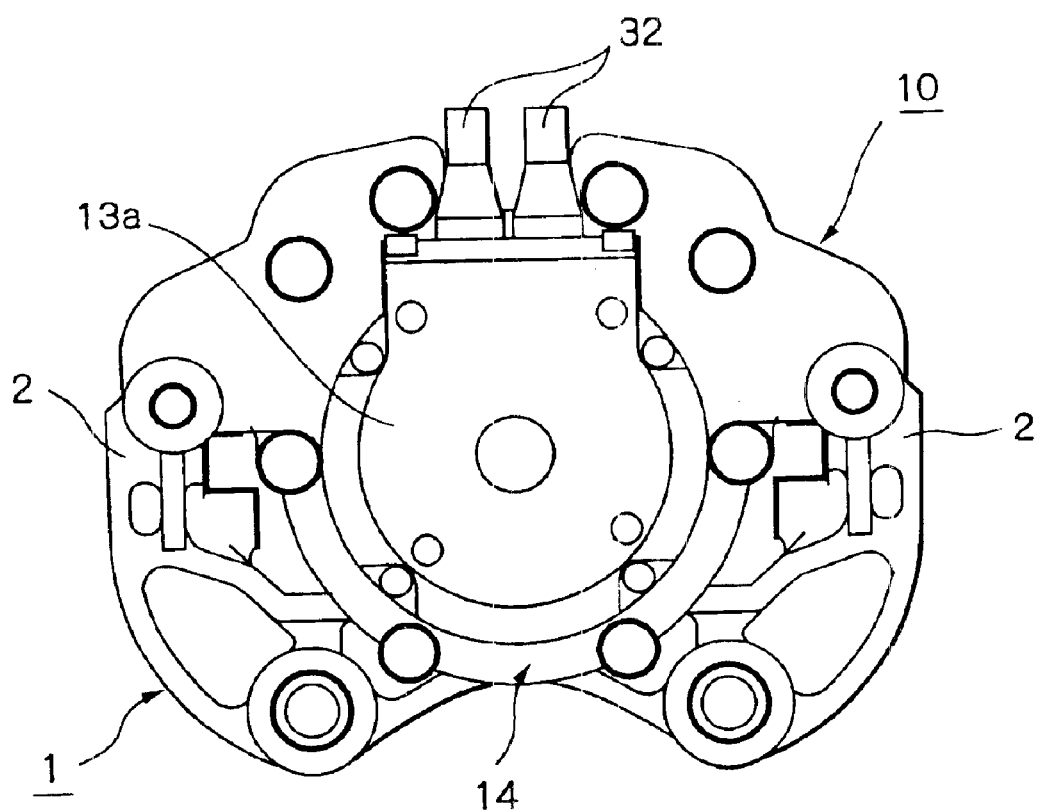
FIG. 7 is a rear view of the electrically operated disc brake.
Figure 8:
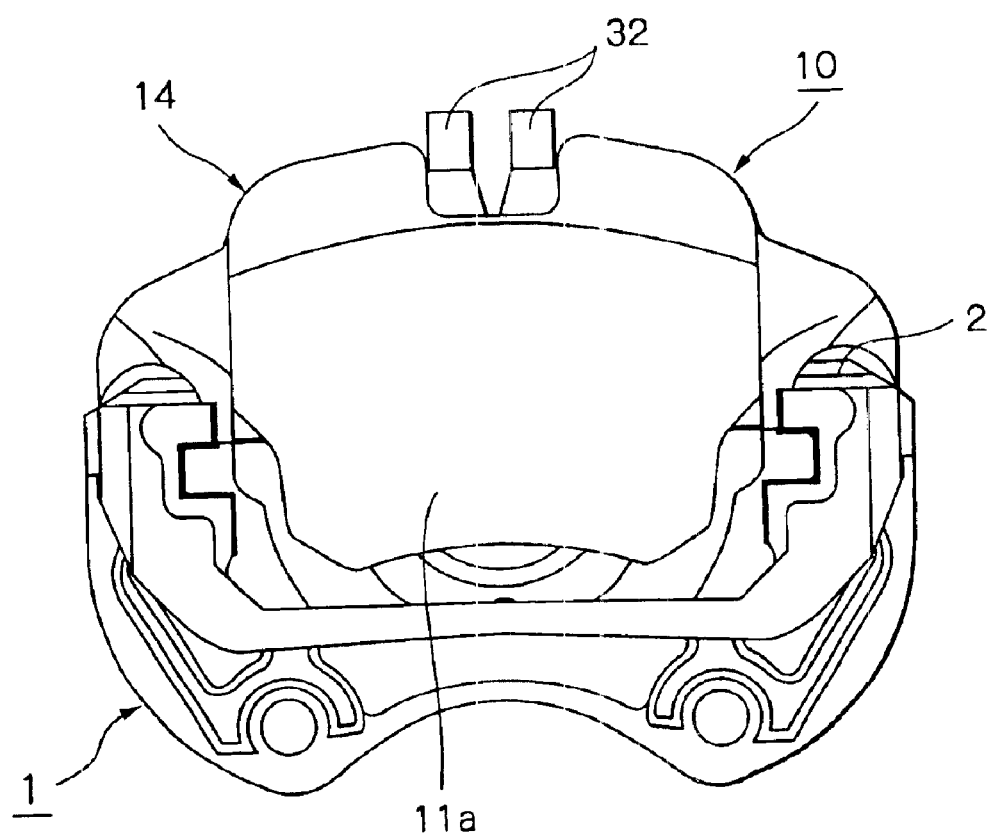
FIG. 8 is a front view of the electrically operated disc brake.
Figure 9:
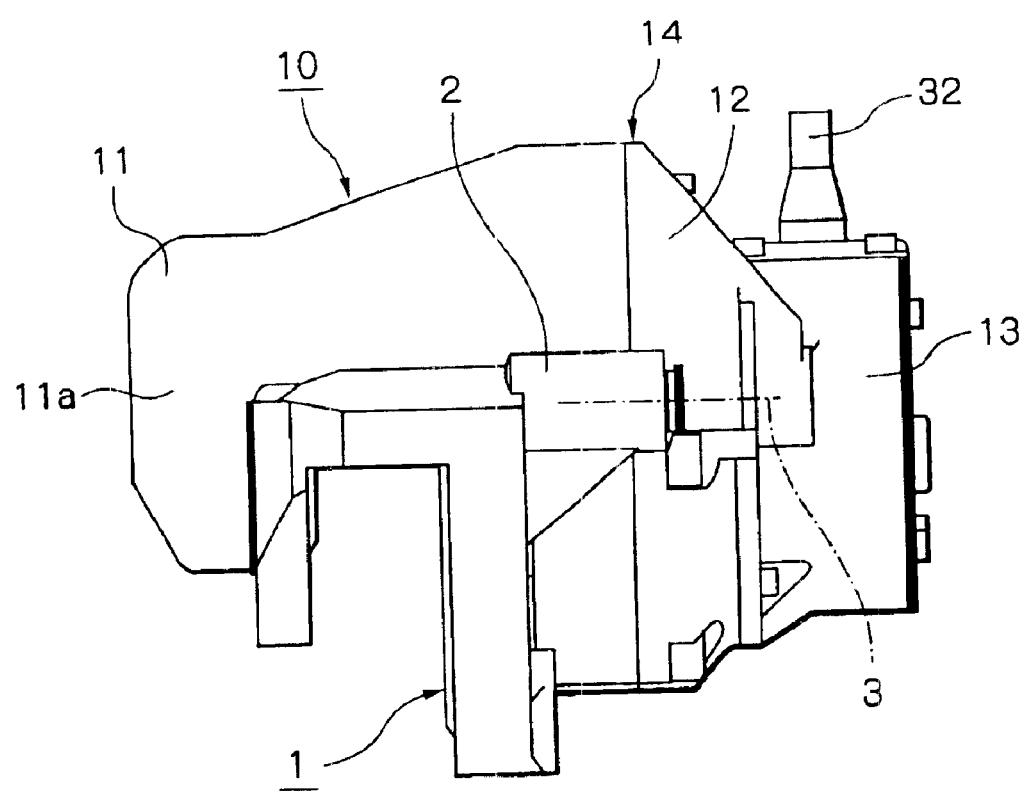
FIG. 9 is a side view of the electrically operated disc brake.

As shown better in FIGS. 4 and 5, the holder 60 has a bottom wall 62 in which a circular central opening 61 is defined, and a cylindrical wall 64. A flange 63 extends radially outwardly from the open end of the cylindrical wall 64 remote from the bottom wall 52. The holder 60 is fit within the caliper body 14 with the flange 63 engaged with a step formed in the inner periphery of the caliper body 14, as shown in FIGS. 1 and 2. This arrangement locks the holder 60 in position within the caliper body 14. An annular seal 65, made of rubber, is integrally fitted in the opening 61 (by integral molding) and held in sliding contact with the smooth cylindrical surface 42 of the piston rod 21. The seal 65 thus guides axial movement of the piston rod 21. A dust boot 66 is connected between the piston head 20 and the caliper body 14. As shown in FIG. 2, the dust boot 66 has a bead 66a pressed against the caliper body 14 by the cylindrical wall 64 of the holder 60. The seal 65 and the dust boot 66 collectively seal between the piston 15 and the caliper body 14.

Figure 10:
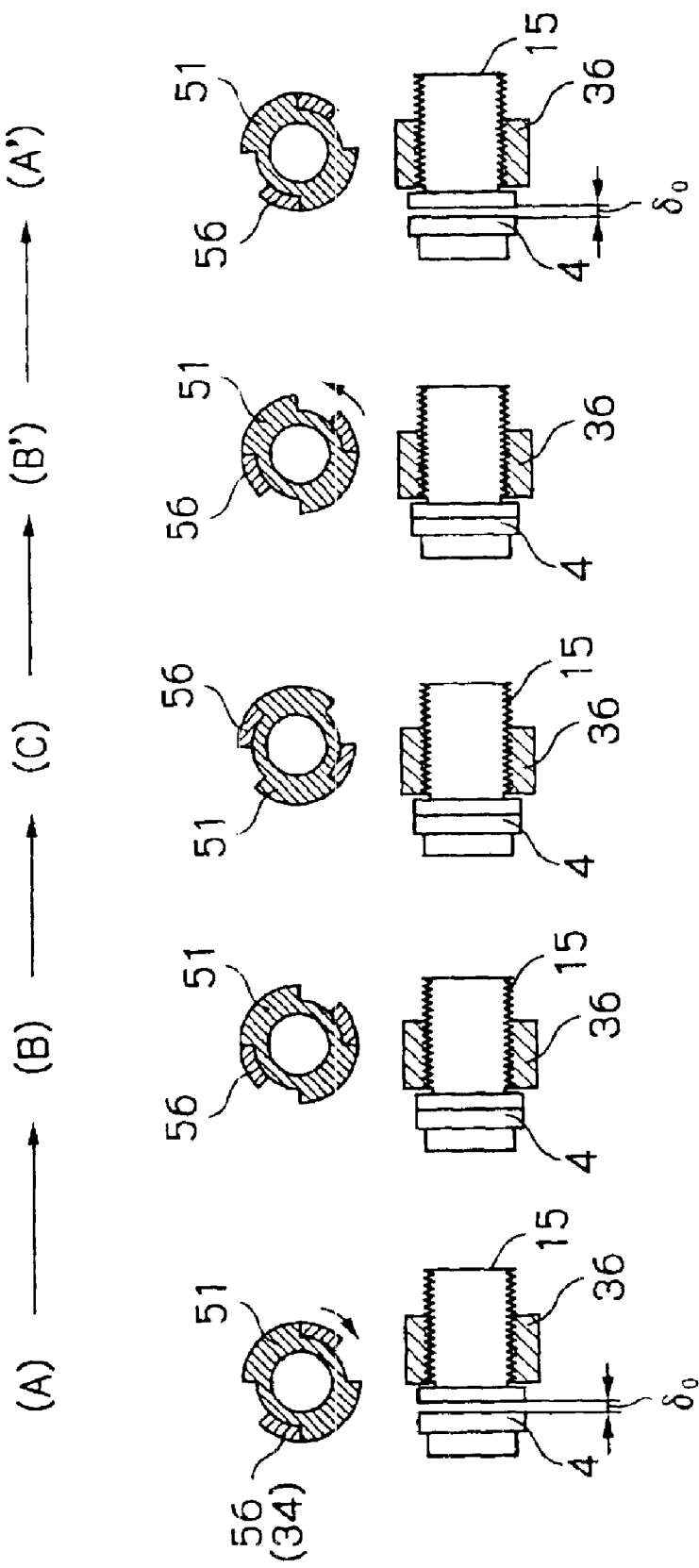
FIG. 10 sequentially illustrates positional relationship between a ball/ramp mechanism and the pad wear adjusting mechanism when no pad wear occurs.
Figure 11:
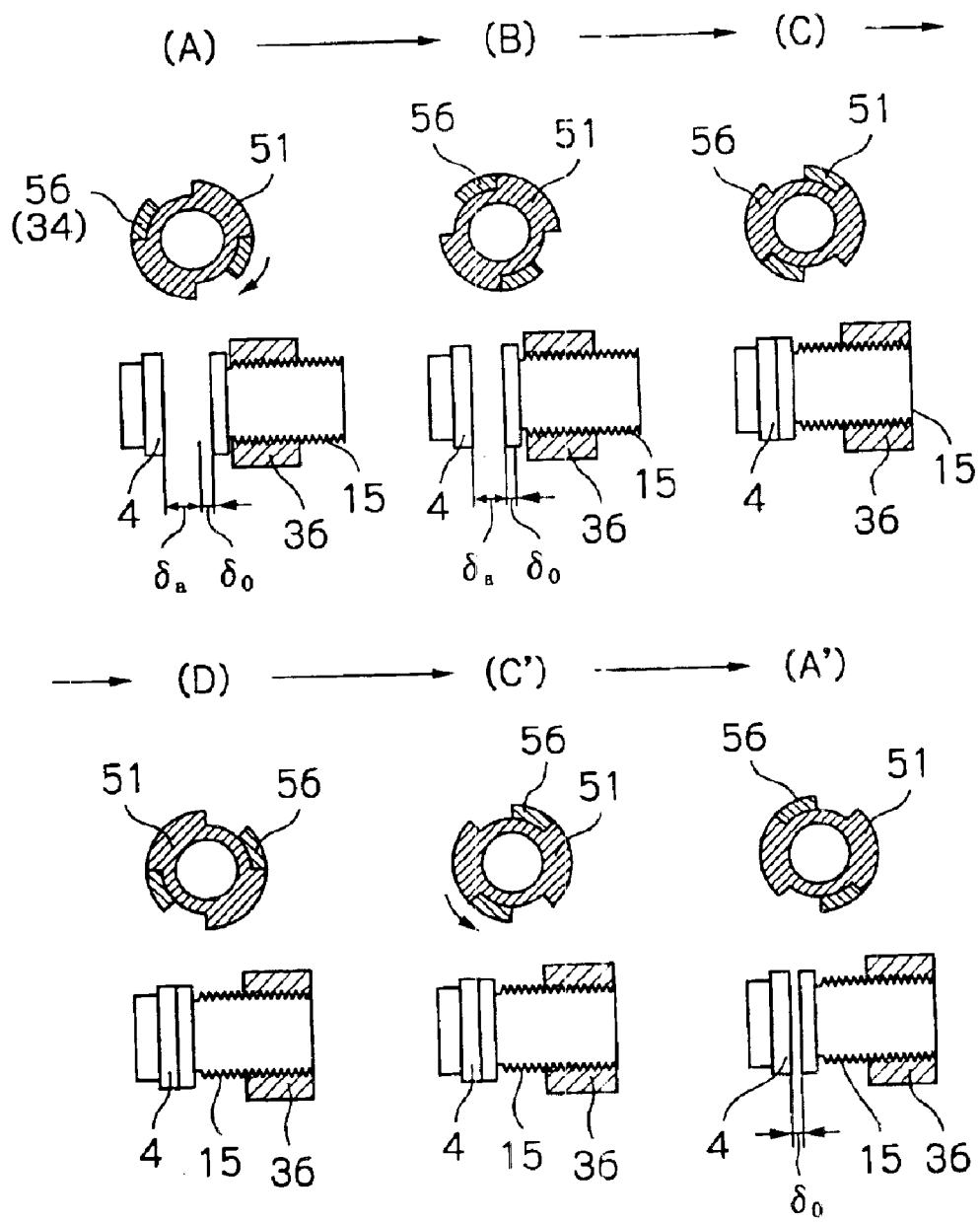
FIG. 11 sequentially illustrates positional relationship between the ball/ramp mechanism and the pad wear adjusting mechanism when pad wear occurs.

Referring to FIGS. 10 and 11, the electrically operated disc brake is operated as follow.

When brake is applied, the controller, not shown, instructs the rotor 26 of the electric motor 16 to rotate in a counter-clockwise direction-when seen from the right side of FIGS. 1 and 2. This causes the first disc member 34 to rotate in a clockwise direction with a fixed reduction rate a through the reduction mechanism 18. The second disc member 36 is then moved toward the disc rotor D. This is because the wave washer 34 provides a frictional force to resist rotation of the second disc member 36. When the rotor 26 is rotated by an angle θ, the angle θA of rotation of the first disc member 34 is represented by θ/α. Also, the distance L of movement of the second disc member 36 is represented by the following formula.

$$S=(L/360) \times (\theta/\alpha)$$

where L is a lead representing inclination of the ball grooves 43, 44 of the ball/ramp mechanism 17.

Advancement of the second disc member 36 causes the piston 15 to slide relative to the seal 65. As a result, the inboard friction pad 4 is urged against the inboard side of the disc rotor D. The resulting reaction force causes the caliper 10 to move relative to the carrier 1. Then, the leg 11a of the pawl 11 urges the outboard friction pad 5 against the outboard side of the disc rotor D. This results in braking of the disc rotor D with a force corresponding to the amount of output torque of the electric motor 16. It is to be understood that sufficient extent of threading engagement of the female thread 40 and the male thread 41 ensures constant application of thrust to the piston 15.

Where the friction pads 4, 5 have no pad wear, a clearance δO exists between the inboard friction pad 4 and the piston 15 as shown in FIG. 10(A). At this time, the limiter 51 is held in its initial position due to the offset nature of the coil spring 54. The arcuate protections 56 of the first disc member 34 are free to move from one end to the other end of the respective arcuate grooves 55 until the inboard friction pad 4 is brought into contact with the disc rotor D, as shown in FIGS. 10(A and B). Thereafter, the rotor 26 is rotated to thereby urge the inboard friction pad 4 against the disc rotor D or apply thrust to the piston 15 to produce a barking force. The arcuate projections then push the end of the grooves and cause the limiter 51 to rotate as shown in FIGS. 10(B and C). When the braking force is produced, a substantial amount of frictional resistance is developed between the female thread 40 of the second disc member 36 and the male thread 41 of the piston 15. This frictional resistance resists rotation of the second disc member 36. The spring holder 53 is also held against rotation since the spring holder 53 is connected to the second disc member 36 by the pin 52. At this time, the coil spring 54 is twisted or deformed to accommodate angular displacement between the limiter 51 and the spring holder 53.

When the rotor 26 of the electric motor 16 is rotated in a clockwise direction with the brake on, the second disc member 36 and the piston 15 are retreated together under the influence of the disc springs 38. Then, the braking force is no longer applied to the disc rotor D. At this time, the first disc member 34 is rotated in a counterclockwise direction. This rotation causes the limiter 51 to rotate under the bias of the coil spring 54 as shown in FIGS. 10(C and B'). The electric motor 16 is controlled to rotate by an extra amount corresponding to the amount of the clearance δO after the friction pad 4 is released from contacting with the disc rotor D. The first disc member 34 is, thus, further rotated by a predetermined angle and returned to its initial position after the braking force is released, as shown in FIGS. 10 (B' and, A'). This leaves a predetermined amount of clearance δO.

In case that the friction pads 4, 5 are worn, a clearance δa in addition to the clearance δO is formed between the friction pad 4 and the piston 15 as shown in FIG. 11A). Thus, if the arcuate projections 56 of the first disc member 34 are angularly moved from one end to the other end of the respective grooves 55 during counterclockwise rotation of the rotor 26, or when the arcuate projections 56 are moved by an amount corresponding to the clearance δO, the clearance δa still remains between the friction pad 4 and the piston 15 as shown in FIG. 11(B). Further rotation of the rotor 26 causes the arcuate projections 56 of the first disc member 34 to push and rotate the limiter 51. At this time, the preload of the coil spring 54 is greater than the resistance to rotation of the second disc member 36 resulting from the frictional force of the wave washer 34 and other elements. Under the circumstances, rotation of the limiter 51 is transmitted to the second disc member 36 through the coil spring 54, the spring holder 53 and the pin 52. The piston 15 is then moved on the support rod 24 until the friction pad 4 is brought into engagement with the disc rotor, D. As a result, the clearance δa no longer exists between the friction pad 4 and the piston 15 as shown in FIG. 11(C). The female thread 40 of the cylindrical portion 37 has a sufficient length to eliminate the clearance δa which corresponds to the amount of pad wear.

Further rotation of the rotor 26 causes the piston 15 to move toward the disc rotor D to produce a braking force. The arcuate projections 56 of the first disc member 34 then push and rotate the limiter 51 as shown in FIGS. 11(C and D). At this time, a substantial amount of fictional resistance is developed between the male thread 41 of the piston 15 and the female thread 40 of the second disc member 36. This frictional resistance resists rotation of the second disc member 36. Also, the spring holder 53 is held against rotation since the spring holder 53 is connected to the second disc member 36 by the pin 52. The coil spring 54 is twisted or deformed to accommodate angular displacement between the limiter 51 and the spring holder 53.

When the rotor 26 of the electric motor 16 is rotated in a clockwise direction with the brake on, the second disc member 36 and the piston 15 are retreated together under the influence of the disc springs 38. Then, the braking force is no longer applied to the disc rotor D. At this time, the first disc member 34 is rotated in a counterclockwise direction. This rotation causes the limiter 51 to rotate under the bias of the coil spring 54. The limiter 51 is then returned to such a position that trust is started to be applied to the piston 15 as shown in FIGS. 11 (D and C'). The electric motor 16 is controlled to rotate by an extra amount corresponding to the amount of the clearance δO after the friction pad 4 is released from contacting with the disc rotor D. The first disc member 34 is further rotated by a predetermined angle and returned to such a position that the arcuate projections 56 are brought into engagement with one end of the respective grooves 55 as shown in FIGS. 11(C' and A'). This leaves a predetermined amount of clearance δO.

In the event that the electric motor 16 is damaged due, for example, to broken wires during braking operation, the limiter 51 is caused to rotate in a counterclockwise direction under the bias of the coil spring 54. This forces the first disc member 34 to rotate in the same direction. The second disc member 36 and the piston 15 are then retreated together under the bias of the disc springs 38. The friction pad 4 is no longer urged against the disc rotor 14. This arrangement allows for automatic release of locked braking due to motor malfunction. No manual handling is required to avoid this undesirable condition. When the brake is released, the limiter 51 is returned to such a position that thrust is started to be applied to the piston 15 as shown in FIGS. 10(B and C).

The seal 65 and the dust boot 66 collectively form a dual seal arrangement and reliably seal between the piston 15 and the caliper body 14. If the dust boot 66 is damaged, the seal 65 effectively prevents entry of water and dust into the caliper body 14. Such a dual seal arrangement ensures high performance of the electrically operated brake disc for a prolonged period of time.

As described above, the smooth cylindrical surface of the piston serves as a sliding surface when the piston is moved through the seal. This arrangement allows the use of the dust boot and the seal with no adverse effect on operation of the pad wear adjusting mechanism. This dual seal arrangement significantly increases the service life of the electrically operated brake disc.

The cup-shaped holder is positioned to press one end of the dust boot against the caliper body. The holder is used to hold both the seal and the dust boot. This brings about a reduction in the fabrication cost of the overall disc brake.

The piston head has a diameter substantially greater than that of the piston rod. This large diameter piston head allows the dust boot to be mounted in a compact manner.

What is claimed is:

1. An electrically operated disc brake comprising:
   a caliper having a caliper body;
   an electric motor mounted within the caliper body;
   a piston supported by the caliper body and operatively connected to the electric motor, said piston having a threaded section;
   a ball/ramp mechanism disposed within the caliper body and including an axially movable member, said axially movable member having a threaded section threadably engaged with the threaded section of the piston, said ball/ramp mechanism being operable to convert rotary motion of the electric motor to linear motion and transmit the linear motion to the piston so that the piston is advanced in response to operation of the electric motor to urge a pair of friction pads against opposite sides of a disc rotor to thereby produce a braking force;
   a pad wear adjusting mechanism disposed within the caliper body, said pad wear adjusting mechanism being operable to threadably move the threaded section of the piston relative to the threaded section of the axially movable member in response to the amount of pad wear;
   a dust boot connected between the piston and the caliper body;
   a holder associated with the caliper body to collectively define a caliper housing within which the electric motor, the ball/ramp mechanism and the pad wear adjusting mechanism are contained, said holder having an opening through which the piston extends; and
   a seal disposed in the opening of the holder,
   said piston having a smooth section extending from the threaded section toward the disc rotor, said smooth section of the piston being slidably received in the seal.

2. An electrically operated disc brake according to claim 1, wherein the holder is in the form of a cup and has a cylindrical wall positioned to press one end of the dust boot against the caliper body for fixture of said dust boot end.

3. An electrically operated disc brake according to claim 1, wherein the piston includes a relatively large diameter piston head located adjacent to the disc rotor and connected to the dust boot, and a relatively small diameter piston rod in which said smooth section is formed, said piston head being in the form of a circular disc joined to the piston rod.

4. An electrically operated disc brake according to claim 2, wherein the piston includes a relatively large diameter piston head located adjacent to the disc rotor and connected to the dust boot, and a relatively small diameter piston rod in which said smooth section is formed, said piston head being in the form of a circular disc joined to the piston rod.

* * * * *